United States Patent
Fredenburg et al.

(10) Patent No.: US 7,185,224 B1
(45) Date of Patent: Feb. 27, 2007

(54) PROCESSOR ISOLATION TECHNIQUE FOR INTEGRATED MULTI-PROCESSOR SYSTEMS

(75) Inventors: William Fredenburg, Apex, NC (US); Kenneth Michael Key, Raleigh, NC (US); Michael L. Wright, Raleigh, NC (US); John William Marshall, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

(21) Appl. No.: 10/731,971

(22) Filed: Dec. 10, 2003

Related U.S. Application Data

(63) Continuation of application No. 09/432,526, filed on Nov. 3, 1999, now Pat. No. 6,681,341.

(51) Int. Cl.
*G06F 11/00* (2006.01)
(52) U.S. Cl. .......................................... 714/10; 714/11
(58) Field of Classification Search .................. 714/10; 712/10, 32
See application file for complete search history.

(56) References Cited

U.S. PATENT DOCUMENTS

| | | | |
|---|---|---|---|
| 4,356,546 A * | 10/1982 | Whiteside et al. ............ 714/10 |
| 4,438,494 A * | 3/1984 | Budde et al. .................. 714/2 |
| 4,590,554 A | 5/1986 | Glazer et al. |
| 4,598,400 A | 7/1986 | Hillis |
| 4,709,327 A | 11/1987 | Hillis et al. |
| 4,773,038 A | 9/1988 | Hillis et al. |
| 4,791,641 A | 12/1988 | Hillis |
| 4,805,091 A | 2/1989 | Thiel et al. |
| 4,809,202 A | 2/1989 | Wolfram |
| 4,870,568 A | 9/1989 | Kahle et al. |
| 4,922,486 A | 5/1990 | Lidinsky et al. |
| 4,949,239 A | 8/1990 | Gillett, Jr. et al. |
| 4,965,717 A | 10/1990 | Cutts, Jr. et al. |
| 4,993,028 A | 2/1991 | Hillis |
| 5,020,059 A * | 5/1991 | Gorin et al. ................... 714/3 |
| 5,070,446 A | 12/1991 | Salem |
| 5,093,801 A | 3/1992 | White et al. |
| 5,111,198 A | 5/1992 | Kuszmaul |
| 5,113,510 A | 5/1992 | Hillis |
| 5,117,420 A | 5/1992 | Hillis et al. |
| 5,129,077 A | 7/1992 | Hillis |
| 5,148,547 A | 9/1992 | Kahle et al. |
| 5,151,996 A | 9/1992 | Hillis |
| 5,157,663 A | 10/1992 | Major et al. |
| 5,161,156 A | 11/1992 | Baum et al. |
| 5,166,674 A | 11/1992 | Baum et al. |
| 5,168,499 A * | 12/1992 | Peterson et al. .............. 714/30 |

(Continued)

OTHER PUBLICATIONS

Tanenbaum, Andrew S. Structured Computer Organization. Copyright 1990. Prentice Hall, Inc. pp. 11-13.*

(Continued)

*Primary Examiner*—Robert W Beausoliel, Jr.
*Assistant Examiner*—Matthew Urick
(74) *Attorney, Agent, or Firm*—Cesari and McKenna LLP

(57) ABSTRACT

A processor isolation technique enhances debug capability in a multiprocessor circuit. A bypass register has a bit location which may indicate that a processor is to be bypassed. A code entry point is selected to permit a downstream processor to do the work of the bypassed processor. The processors may be arrayed in a pipeline.

16 Claims, 9 Drawing Sheets

U.S. PATENT DOCUMENTS

| | | | |
|---|---|---|---|
| 5,175,865 A | 12/1992 | Hillis | |
| 5,212,773 A | 5/1993 | Hillis | |
| 5,222,216 A | 6/1993 | Parish et al. | |
| 5,222,237 A | 6/1993 | Hillis | |
| 5,247,613 A | 9/1993 | Bromley | |
| 5,247,694 A | 9/1993 | Dahl | |
| 5,255,291 A | 10/1993 | Holden et al. | |
| 5,261,105 A | 11/1993 | Potter et al. | |
| 5,265,207 A | 11/1993 | Zak et al. | |
| 5,274,631 A | 12/1993 | Bhardwaj | |
| 5,289,156 A | 2/1994 | Ganmukhi | |
| 5,295,258 A | 3/1994 | Jewett et al. | |
| 5,297,263 A * | 3/1994 | Ohtsuka et al. | 712/244 |
| 5,301,310 A | 4/1994 | Isman et al. | |
| 5,317,726 A | 5/1994 | Horst | |
| 5,355,492 A | 10/1994 | Frankel et al. | |
| 5,357,612 A | 10/1994 | Alaiwan | |
| 5,361,363 A | 11/1994 | Wells et al. | |
| 5,367,692 A | 11/1994 | Edelman | |
| 5,388,214 A | 2/1995 | Leiserson et al. | |
| 5,388,262 A | 2/1995 | Hillis | |
| 5,390,298 A | 2/1995 | Kuszmaul et al. | |
| 5,404,296 A | 4/1995 | Moorhead | |
| 5,404,562 A | 4/1995 | Heller et al. | |
| 5,410,723 A | 4/1995 | Schmidt et al. | |
| 5,455,932 A | 10/1995 | Major et al. | |
| 5,485,627 A | 1/1996 | Hillis | |
| 5,530,804 A * | 6/1996 | Edgington et al. | 714/30 |
| 5,530,809 A | 6/1996 | Douglas et al. | |
| 5,535,408 A | 7/1996 | Hillis | |
| 5,561,669 A | 10/1996 | Lenney et al. | |
| 5,617,538 A | 4/1997 | Heller | |
| 5,621,885 A | 4/1997 | Del Vigna, Jr. | |
| 5,623,689 A * | 4/1997 | Kaneko | 712/11 |
| 5,627,965 A | 5/1997 | Liddell et al. | |
| 5,673,423 A | 9/1997 | Hillis | |
| 5,710,814 A | 1/1998 | Klemba et al. | |
| 5,742,604 A | 4/1998 | Edsall et al. | |
| 5,751,955 A | 5/1998 | Sonnier et al. | |
| 5,764,636 A | 6/1998 | Edsall | |
| 5,787,255 A | 7/1998 | Parlan et al. | |
| 5,838,915 A | 11/1998 | Klausmeier et al. | |
| 6,021,511 A * | 2/2000 | Nakano | 714/10 |
| 6,101,599 A | 8/2000 | Wright et al. | |
| 6,112,288 A * | 8/2000 | Ullner | 712/20 |
| 6,119,215 A | 9/2000 | Key et al. | |
| 6,173,386 B1 | 1/2001 | Key et al. | |
| 6,195,739 B1 | 2/2001 | Wright et al. | |
| 6,349,378 B1 * | 2/2002 | Duranton et al. | 712/28 |
| 6,356,548 B1 | 3/2002 | Nellenbach et al. | |
| 6,385,747 B1 | 5/2002 | Scott et al. | |
| 6,505,269 B1 | 1/2003 | Potter | |
| 6,513,108 B1 | 1/2003 | Kerr et al. | |
| 6,529,983 B1 | 3/2003 | Marshall et al. | |
| 6,532,553 B1 * | 3/2003 | Gwilt et al. | 714/38 |
| 6,681,341 B1 | 1/2004 | Fredenburg et al. | |
| 6,728,839 B1 | 4/2004 | Marshall | |
| 6,876,961 B1 | 4/2005 | Marshall et al. | |
| 6,920,562 B1 | 7/2005 | Kerr et al. | |

OTHER PUBLICATIONS

Computer Architecture The Anatomy of Modern Processors, Pipeline Hazards, world wide web page http://ciips.ee.uwa.edu.au/~morris/CA406/pipe_hazard.html, 1999, pp. 1-6.
U.S. Appl. No. 09/390,079, filed Sep. 1999, Kerr et al.
U.S. Appl. No. 09/106,478, filed Jun. 29, 1998, Kerr, et al.
U.S. Appl. No. 09/106,245, filed Jun. 29, 1998, Nellenbach, et al.
U.S. Appl. No. 09/181,251, filed Oct. 28, 1998, Marshall.
U.S. Appl. No. 09/216,519, filed Dec. 18, 1998, Kerr, et al.
U.S. Appl. No. 09/212,314, filed Dec. 14, 1998, Scott, et al.
U.S. Appl. No. 09/432,526, filed Nov. 3, 1999, Fredenburg, et al.
U.S. Appl. No. 09/432,464, filed Nov. 3, 1999, Marshall, et al.
U.S. Appl. No. 09/384,504, filed Aug. 27, 1999, Marshall, et al.
U.S. Appl. No. 09/390,079, filed Sep. 3, 1999, Kerr, et al.
U.S. Appl. No. 09/571,213, filed May 16, 2000, Potter.

* cited by examiner

PROCESSOR ISOLATION TECHNIQUE FOR INTEGRATED MULTI-PROCESSOR SYSTEMS

CROSS-REFERENCE TO RELATED APPLICATION

The present application is a continuation of U.S. patent application Ser. No. 09/432,526, now issued as U.S. Pat. No. 6,681,341, which was filed on Nov. 3, 1999, by William Fredenburg et al.

FIELD OF THE INVENTION

The present invention relates generally to a programmable arrayed processing engine of a network switch and more particularly, to a method and apparatus for debugging failures of processors within a programmable arrayed processing engine.

BACKGROUND OF THE INVENTION

Computer architecture generally defines the functional operation, including the flow of information and control, among individual hardware units of a computer. One such hardware unit is a processing engine that contains arithmetic and logic processing circuits organized as a set of data paths. In some implementations, the data path circuits may be configured as a processor having operations that are defined by a set of instructions. The instructions are typically stored in an instruction memory and specify a set of hardware functions that are available on the processor. When implementing these functions, the processor generally processes "transient" data residing in a data memory in accordance with the instructions.

A high-performance processing engine may be realized by using a number of identical processors to perform certain tasks in parallel. For a purely parallel multiprocessor architecture, each processor may have shared or private access to non-transient data, such as program instructions (e.g., algorithms) stored in a memory coupled to the processor. Access to an external memory is generally inefficient because the execution capability of each processor is substantially faster than its external interface capability; as a result, the processor often idles while waiting for the accessed data. Moreover, scheduling of external accesses to a shared memory is cumbersome because the processors may be executing different portions of the program.

In an alternative implementation, the data paths may be configured as a pipeline having a plurality of processor stages. This configuration conserves internal memory space since each processor executes only a small portion of the program algorithm. A drawback, however, is the difficulty in apportioning the algorithm into many different stages of equivalent duration. Another drawback of the typical pipeline is the overhead incurred in transferring transient "context" data from one processor to the next in a high-bandwidth application.

One example of such a high-bandwidth application involves the area of data communications and, in particular, the use of a parallel, multiprocessor architecture as the processing engine for an intermediate network station. The intermediate station interconnects communication links and subnetworks of a computer network to enable the exchange of data between two or more software entities executing on hardware platforms, such as end stations. The stations typically communicate by exchanging discrete packets or frames of data according to predefined protocols, such as the Transmission Control Protocol/Internet Protocol (FCP/IP), the Internet Packet Exchange (IPX) protocol, the AppleTalk protocol or the DECNet protocol. In this context, a protocol consists of a set of rules defining how the stations interact with each other.

A router is an intermediate station that implements network services such as route processing, path determination and path switching functions. The route processing function determines the type of routing needed for a packet, whereas the path switching function allows a router to accept a frame on one interface and forward it on a second interface. The path determination, or forwarding decision, function selects the most appropriate interface for forwarding the frame. A switch is also an intermediate station that provides the basic functions of a bridge including filtering of data traffic by medium access control (MAC) address, "learning" of a MAC address based upon a source MAC address of a frame and forwarding of the frame based upon a destination MAC address. Modern switches further provide the path switching and forwarding decision capabilities of a router. Each station includes high-speed media interfaces for a wide range of communication links and subnetworks.

Increases in the frame/packet transfer speed of an intermediate station are typically achieved through hardware enhancements for implementing well-defined algorithms, such as bridging, switching and routing algorithms associated with the predefined protocols. Hardware implementation of such an algorithm is typically faster than software because operations can execute in parallel more efficiently. In contrast, software implementation of the algorithm on a general-purpose processor generally performs the tasks sequentially because there is only one execution path. Parallel processing of conventional data communications algorithms is not easily implemented with such a processor, so hardware processing engines are typically developed and implemented in application specific integrated circuits (ASIC) to perform various tasks of an operation at the same time. These ASIC solutions distinguish themselves by speed and the incorporation of additional requirements beyond those of the basic algorithm functions. However, the development process for such an engine is time consuming and expensive and, if the requirements change, inefficient since a typical solution to a changing requirement is to develop a new ASIC.

Such an ASIC solution may comprise an arrayed processing engine having a plurality of processor pipelines. Each element of the processor pipeline comprises a processor complex that includes, among other things, an instruction random access memory (IRAM) for storing executable program code routines and a central processing unit (CPU) that is programmable with respect to execution of the code. Each processor complex of a pipeline performs different processing on (packet) data propagating through various "stages" of the pipeline in accordance with a programmed code segment or routine. A code entry point for a particular routine is provided by an upstream CPU of each processor complex for each downstream CPU in the pipeline, thereby rendering the program code executed by each processor dependent on other processors in the engine.

Because of the size and complexity of such a highly integrated ASIC, it is rather difficult to build entirely functioning processor complexes, especially in the early yield learning of advanced semiconductor processes. As a result, a processor complex of a pipeline may fail during production of the ASIC causing failure of the entire pipeline because data is unable to be passed among the processor complexes of the pipeline. Since the code executed by a downstream processor complex is dependent upon the "work" previously performed by an upstream processor complex, a software developer that is developing code for the downstream processor of a pipeline depends upon and expects certain operations to have been performed in order to provide the correct scenario for the code. Failure of an upstream processor complex may impact such program code development.

Data bypassing capabilities are generally not required for processor stages of a conventional pipeline processor because each processor stage is typically "hardware assisted" in that there are specific circuits associated with the function performed by the stage on data passing through the pipeline. Therefore, a subsequent processor stage generally cannot be programmed to perform the function of a previous stage, completion of which is typically required prior to performance of the subsequent stage function.

Therefore, an object of the present invention is to provide a mechanism for isolating a processor complex of an arrayed processing engine.

Another object of the invention is to provide a mechanism for supplying an independent code entry point for a programmable processor of an isolated processor complex.

Yet another object of the present invention is to provide a mechanism for advancing code execution of a processor complex within a pipeline of the arrayed processing engine having an isolated processor complex without running code on the isolated processor.

SUMMARY OF THE INVENTION

The present invention provides a processor isolation technique for enhancing debug capability in a highly integrated multiprocessor circuit containing a programmable arrayed processing engine for efficiently processing transient data within an intermediate network station of a computer network. The processing engine generally comprises an array of processor complex elements embedded among input and output buffer units. Each processor complex comprises a microcontroller (TMC) core coupled to an instruction memory and a memory manager circuit. The instruction memory allows, inter alia, programming of the array to process the transient data as stages of baseline or extended pipelines operating in parallel.

In the illustrative embodiment, the processor complexes are arrayed as rows and columns. That is, the processor complexes of each row are configured as stages of a pipeline that sequentially execute operations on the transient data, whereas the processor complexes of each column operate in parallel to perform substantially the same operation on that data, but with a shifted phase. The processor complexes of each row are connected by a data path that serially passes data and control "context" among the stages of the pipelines. This arrangement enables data processing to occur as a series of high-level pipelines that sequentially execute operations on the transient data.

In an aspect of the inventive isolation technique, a mechanism is provided for programming a code entry point for each TMC utilizing a register set that is accessible via an out-of-band bus coupled to a remote processor (RP) of the processing engine. This programmable entry point mechanism provides the flexibility of programming a TMC of a particular processor complex for code execution notwithstanding the states of other processor complexes in the pipeline. According to the invention, the programmable entry point mechanism may operate in conjunction with a bypass capability that passes transient data through a processor complex that is not functional, not running or otherwise unable to process data. Another aspect of the debug technique involves the ability to override completion control signals provided by each processor complex in order to advance a pipeline of the processing engine. This latter aspect of the invention involves a pipeline advancement mechanism that is programmable via the out-of-band RP bus and device.

In accordance with the present invention, the pipeline advancement and entry point mechanisms comprise programmable control circuitry contained within the input buffer unit and each processor complex of the processing engine. Specifically, a first circuit comprising a programmable register coupled to logic circuitry enables overriding of processor complex completion signals to advance execution of a pipeline in the event of failure of a processor complex within the pipeline. In addition, a second circuit comprising a programmable register set and associated multiplexing circuitry allows real-time control over the code entry point for each TMC of a processor complex, independent of code executing in other TMCs. A bypass feature of the memory manager circuit further allows data to flow through an isolated processor complex without requiring operation of the TMC within that processor complex.

Advantageously, the novel isolation technique allows easier, faster debug of complex multiprocessor linked code. In addition, the inventive debug capability allows use of a highly integrated circuit having a plurality of processor pipelines despite the presence of certain defects within stages of the pipeline, such as non-functioning instruction memories and TMCs. The enhanced debug capability described herein enables isolation of a single processor complex, a column of the processor complexes or a row of processor complexes in the arrayed processor engine.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
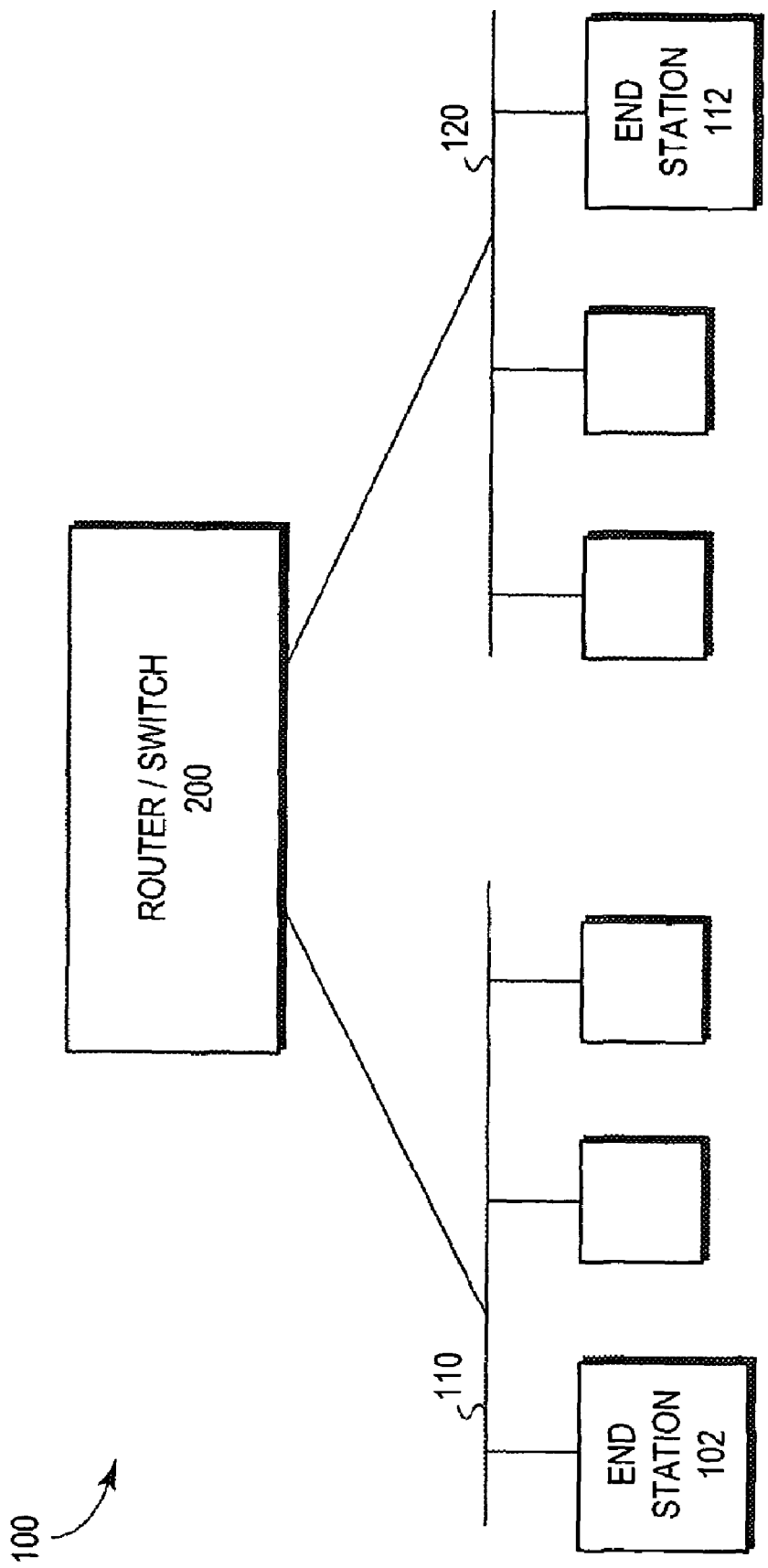
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
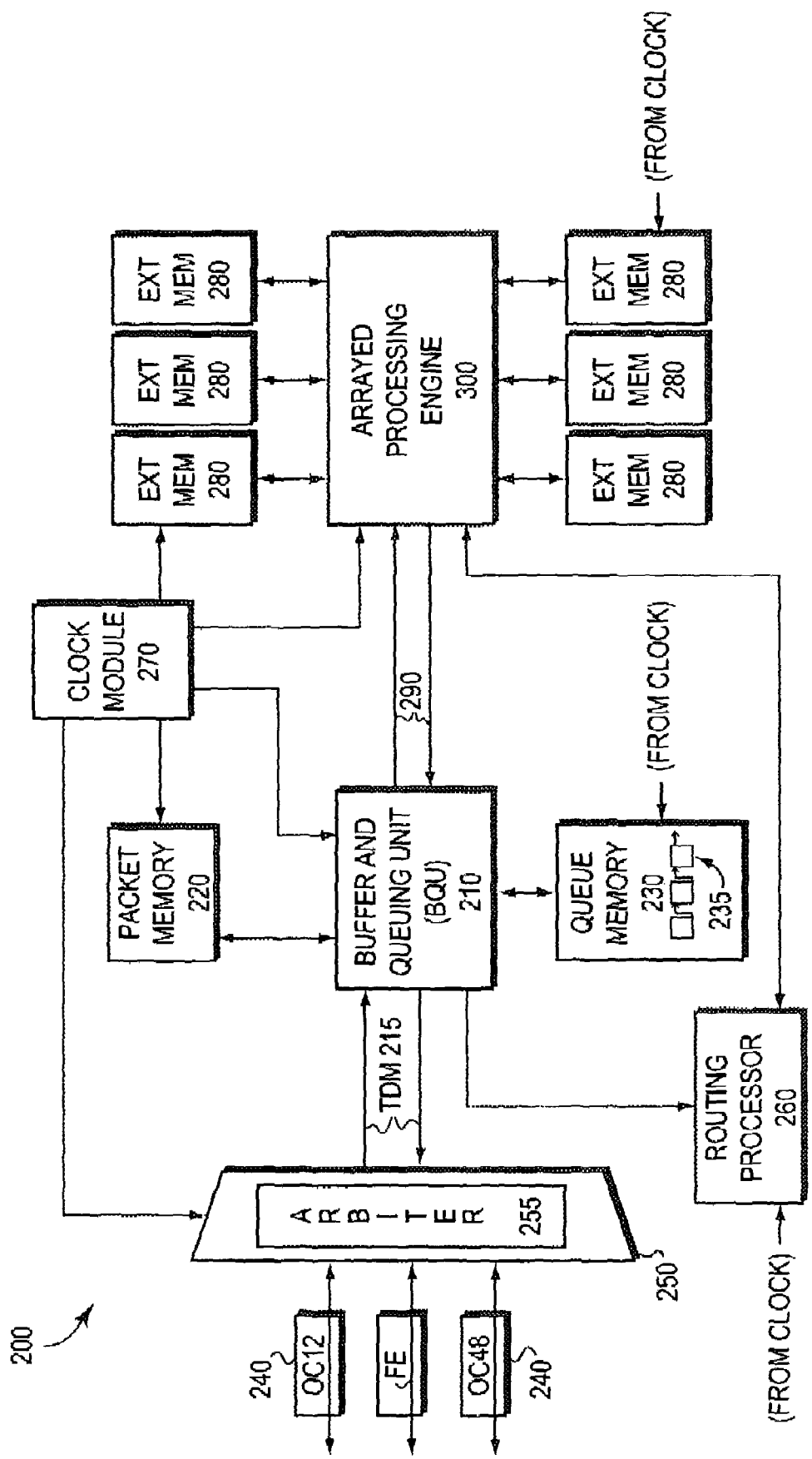
FIG. 2 is a schematic block diagram of intermediate station, such as a network switch, that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the inventive architecture described herein is the ability to program the station for execution of either layer 2 and layer 3 operations. To that end, operation of the switch will be described with respect to IP switching of packets, although the switch may be programmed for other applications, such as data encryption.

The switch 200 comprises a plurality of interconnected components including an arrayed processing engine 300, various memories, queueing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the operation of the switch.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250 having an arbiter 255. The line cards 240 may comprise, e.g., OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many input/output channels on these interfaces, each of which is associated with at least one queue 235 in the queue memory 230. The processing engine 300 generally functions as a switching processor that modifies packets and/or headers in sequence as the BQU 210 implements queuing operations.

A routing processor 260 executes conventional routing protocols for communication directly with the processing engine 300. The routing protocols generally comprise topological information exchanges between intermediate stations to determine optimal paths through the network based on, e.g., destination IP addresses. These protocols provide information used by the processor 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
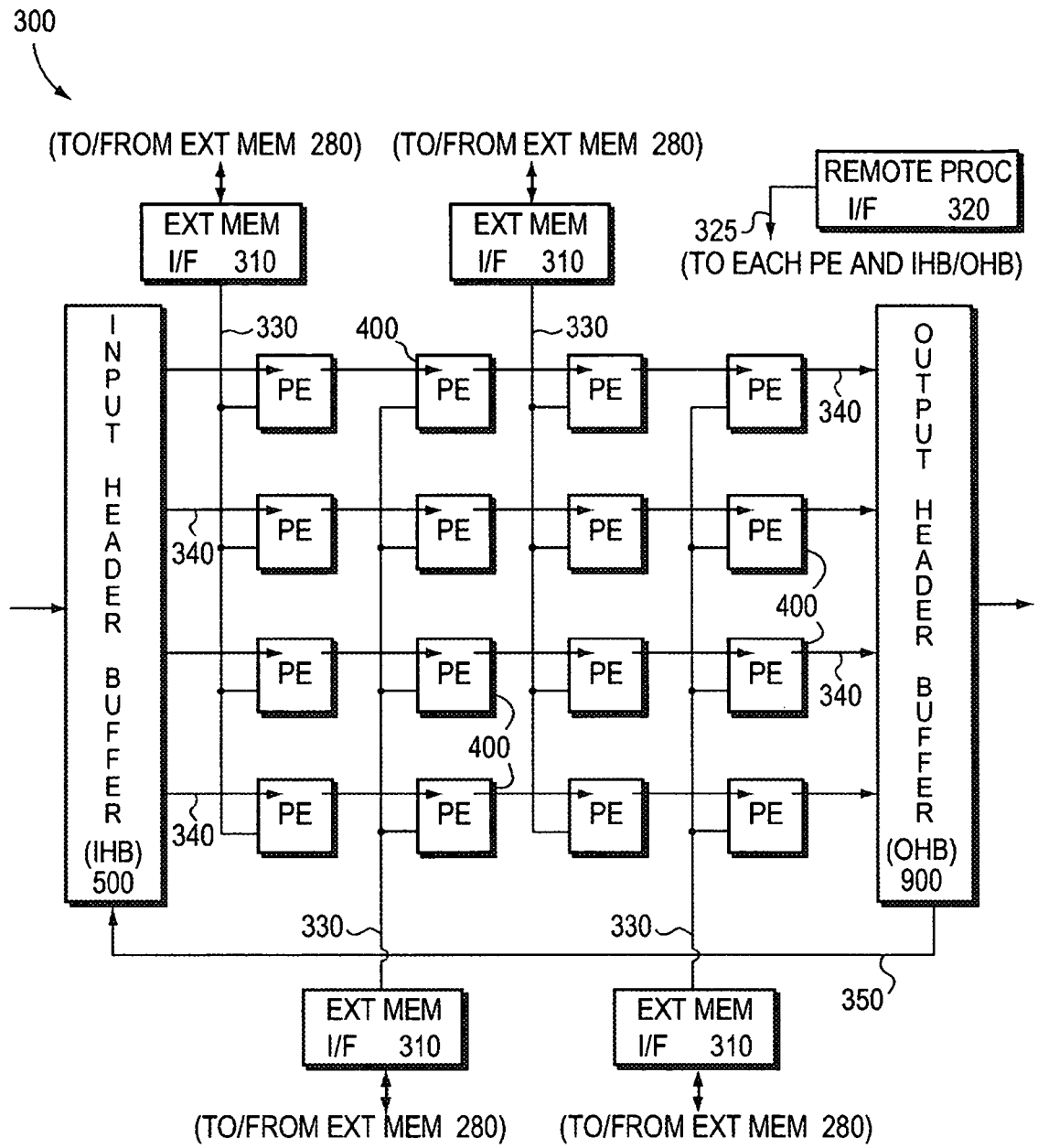
FIG. 3 is a schematic block diagram of a programmable arrayed processing engine having a plurality of processor complex elements.

FIG. 3 is a schematic block diagram of the programmable processing engine 300 which generally comprises an array of processing elements embedded between input and output header buffers with a plurality of interfaces 310 from the array to partitions of an external memory. The external memory stores non-transient data organized within data structures for use in processing the transient data. The non-transient data typically includes "table" data contained in forwarding and routing tables, statistics, access filters, encryption keys and/or queuing information. Transient data enters and exits the engine via 100 MHz 64-bit input and output data interfaces of the BQU 210. Each processing element contains an instruction memory that allows programming of the array to process the transient data as baseline or extended pipelines operating in parallel. A remote processor interface (I/F) 320 provides information, such as instructions and data, from a remote processor (RP) to the PEs and header buffers over a 32-bit maintenance bus 325 having multiplexed address/data lines.

The processing engine 300 comprises a plurality of symmetrically arrayed processing elements (PE) 400. In the embodiment shown in FIG. 3, the processing engine comprises four (4) rows and four (4) columns symmetrically arrayed in a 4×4 configuration between an input header buffer (IHB) 500 and an output header buffer (OHB) 900. However it should be noted that other configurations, such as a 6×6 arrayed configuration or similar rectangularly arrayed configurations, may be advantageously used with the present invention. A 64-bit feedback path 350 couples the OHB 900 to the IHB 500 and provides a data path for recycling data through the PE stages of the processing engine. The PEs of each row are configured as stages connected in series by a 100 MHz 64-bit direct memory access (DMA) data path 340 that synchronously transfers data and control "context" from one PE to the next. Specifically, the processing elements of each row are configured as stages of a pipeline that sequentially execute operations on the transient data loaded by the IHB 500, whereas the processing elements of each column operate in parallel to perform substantially the same operation on the transient data, but with a shifted phase. An example of an arrayed processing engine and network switch suitable for use with the present invention is described in copending and commonly-owned U.S. patent application Ser. No. 09/106,478, now issued as U.S. Pat. No. 6,513,108, titled *Programmable Arrayed Processing Engine Architecture for a Network Switch*.

As described further herein, sequencing circuitry of the IHB 500 controls the processing element stages of each pipeline by ensuring that each stage completes processing of current transient data prior to loading new transient data into the pipeline stages at a new phase. In general, a new phase of processing is started, i.e., a context switch is performed, when all of the PE stages finish processing their current context and new, incoming context is completely received by the IHB. An example of a system for controlling phase processing that is suitable for use with the present invention is described in copending and commonly-owned U.S. patent application Ser. No. 09/106,246 titled *Synchronization and Control System for an Arrayed Processing Engine*, which application is hereby incorporated by reference as though fully set forth herein.

Because they perform similar functions, the columned PEs require similar non-transient "table" data. Therefore, the external memory is partitioned into a plurality of external memory (Ext Mem) resources 280, each of which is dedicated to a respective column of PEs and further configured with non-transient table data needed to support the similar function performed by the columned processor elements. Each column of PEs is coupled to a 200 MHz 32-bit external memory interface data path (Ext Mem I/F) 310 for accessing the non-transient data.

Figure 4:
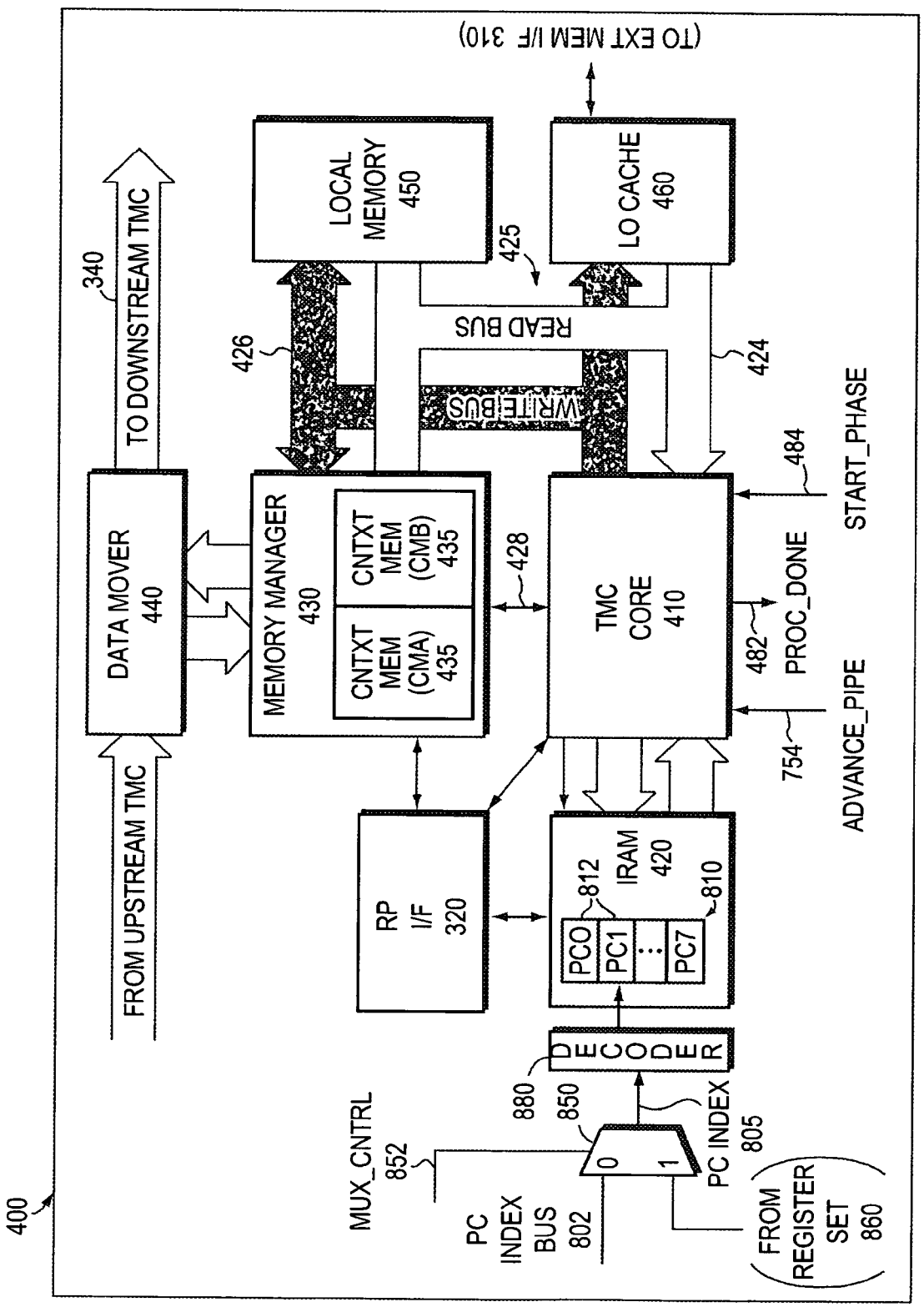
FIG. 4 is a schematic block diagram of a processor complex element in accordance with the present invention.

FIG. 4 is a schematic block diagram of a PE 400. The PE is a processor complex comprising a processor 410 coupled to an instruction memory (IRAM) 420 and a memory manager (MM) circuit 430. The MM 430 contains a pair of context data memory (Cntxt Mem) structures 435 that store transient data, such as frame/packet headers and/or data, for processing by the processor in accordance with instructions stored in the IRAM 420. The processor 410 is preferably a customized microcontroller (TMC) core having a dense structure which enables implementation of similar cores on an application specific integrated circuit (ASIC). It will be apparent to those skilled in the art, however, that other processor cores may be advantageously used with the processor complex architecture described herein.

The TMC core 410 is preferably a pipelined processor that includes a plurality of arithmetic logic units (ALUs), a register file having a plurality of 32-bit internal registers and an instruction fetch and decode unit organized as a set of data paths. The internal registers generally store intermediate result information processed by the ALUs, whereas the instruction fetch and decode unit decodes instructions fetched from the IRAM. The intermediate results are passed among PE stages 400 of the engine 300 over a consistent data path channel 340 provided by a data mover circuit 440 coupled to the MM 430. The TMC also supports fast task context switching to enable software pipelining across multiple cores.

Each context memory 435 stores transient "context" data (e.g., packet data) flowing through the PE 400 that is unique to a specific process. One context memory (CMA) is associated with a phase A context and the other memory (CMB) is associated with a phase B context. During a current pipeline phase, the TMC accesses data from its current context, which may be alternately stored in CMA and CMB. Any modification of context data is written to the current context memory as well as to the downstream complex's next context memory (e.g., current context memory CMA and downstream context memory CMB). Management of the context sensitive memories 435 is provided by the MM 430.

Specifically, the MM 430 comprises data path and control logic for cooperating with the context memories 435 to efficiently pass data among the PE stages of the processing engine via the data mover 440 and for interfacing to a local bus 425. The local bus 425 is preferably a 64-bit bus comprising a read bus portion 424 and a write bus portion 426 that interconnects the TMC core with the context memories 435, a local memory 450 and a level zero (L0) cache 460 coupled to an external memory I/F 310. The local memory 450 is configured to store, inter alia, pointers that reference data structures and tables stored in external memory 280 for use by the TMC core 410.

The MM 430 further contains a state machine (not shown) that determines the current phase (A or B) to which all TMCs of the processing engine are synchronized; as noted, the current phase specifies from which context memory (CMA or CMB) the TMC processes data. The MM 430 broadcasts the current phase to each TMC via a level-sensitive control signal switch_reg_file over line 428. Each TMC core 410 responds to the level-sensitive signal by selecting a set of context switchable registers for its use during the next phase. For example if the register file signal is "0", the TMC may be instructed to use the CMA context memory whereas if the signal is an asserted "1", the TMC may be instructed to operate on the CMB memory.

The data mover circuit 440 cooperates with the context memories 435 and MM 430 to efficiently pass data among the PE stages of the processing engine. To that end, the data mover 440 generally comprises an address incrementor and interface logic, such as a multiplexer, that retrieves context data from a current context memory and loads it into a context memory of an adjacent "downstream" processor complex of the pipeline. For example, in phase A, the TMC fetches data from CMA while the data mover moves data from CMA to a downstream CMB. Data that the TMC has processed from CMA is written back into CMA and into the downstream CMB. In the illustrative embodiment, data transfers between context memories take place over the data path 340.

Notably, the TMC 410 may operate on the transient data substantially simultaneously with the passing of that data by the data mover 440. After data in the current context memory (e.g., CMA) is processed by the TMC 410, the TMC writes the processed data to the downstream context memory (CMB); meanwhile, the data mover 440 transparently passes the data from CMA to the downstream CMB. At the end of the current phase, the context memories are switched so that the TMC operates on the data in CMB. In the event of write collisions between the TMC and data mover to a same context location, the MM 430 ensures that the TMC takes precedence and exclusively accesses the data item.

As noted the structure of the TMC core (and its respective PE) enables implementation of similar cores and complexes on an ASIC. Because of the size and complexity of such a highly integrated ASIC, though, it is difficult to build entirely functioning PEs, especially in the early yield learning of advanced semiconductor processes. As a result, a PE of a pipeline may fail during production of the ASIC causing failure of the entire pipeline because data is unable to be passed among the TMC cores and PEs of the pipeline. The present invention provides a processor isolation technique for enhancing debug capability in such a highly integrated multiprocessor circuit.

In an aspect of the inventive isolation technique, a mechanism is provided for programming a code entry point for each TMC utilizing a register set that is accessible via an out-of-band bus (i.e., the maintenance bus 325) coupled to the RP I/F 320 of the processing engine 300. The programmable entry point mechanism provides the flexibility of programming a TMC core 410 for code execution notwithstanding the states of other PEs in the pipeline. This mechanism may further operate in conjunction with a bypass capability that passes transient data through a PE that is not functional, not running or otherwise unable to process data. Moreover another aspect of the debug technique allows overriding of completion control signals provided by each PE in order to advance the data among the PEs of a pipeline of the engine 300.

Figure 5:
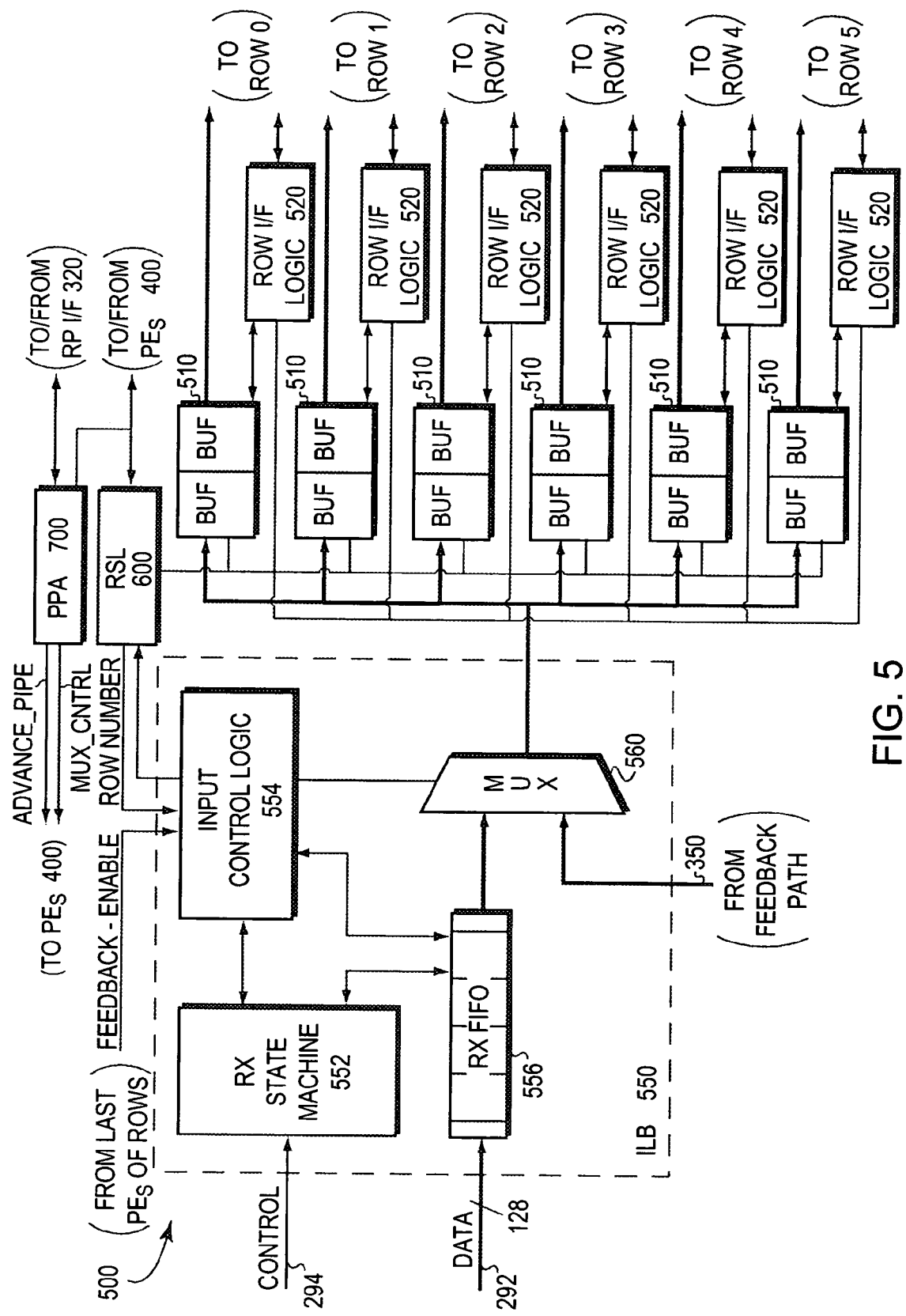
FIG. 5 is a schematic block diagram of an input header buffer (IHB) of the programmable arrayed processing engine.

As described herein, the pipeline advancement and entry point mechanisms comprise programmable control circuitry contained within each PE 400 and the IHB 500 of the processing engine 300. FIG. 5 is a schematic block diagram of the IHB 500 which functions as a sequencer to control the PE stages of the processing engine such that the columned PEs may perform their operations at staggered, shifted phases with respect to each other. A new phase for each row is started by the IHB when all of the PE stages finish processing their current context and either new, incoming context is completely received for that row from the data interface or feedback path or a configurable minimum number of cycles has elapsed since the previous row shifted its phase. The IHB 500 receives data context from either the data interface of the BQU 210 or from the feedback path 350 and provides the context to each pipeline in succession with feedback data context generally having priority over incoming data context. The data interface preferably includes a path 290 comprising a data portion 292 and a control portion 294 for transferring predetermined control signals that manage the flow of data to (and from) the engine. Broadly stated, the IHB advances a pipeline row and begins moving a new packet header or context to a first stage of a next row in response to completion signals from all stages of that row.

The IHB 500 comprises a plurality of buffer pairs (BUF 510), similar to the context memories 435 of a processor complex element 400, with each pair associated with a pipeline row. As transient data enters the engine, it is sequentially loaded into one of the paired buffers 510 for a particular row before being dispatched to a first stage of that row. The IHB presents a context-in/context-out interface (row I/F logic 520) that provides write enable, data and address signals to and from the buffers and context memories; preferably, the logic 520 is substantially identical to the data mover 440 of each PE 400. This enables the processing engine to scale efficiently, thereby allowing the pipelines to be as "deep" as desired.

The IHB also includes an input logic block (ILB 550) comprising a receive (Rx) state machine 552 coupled to an input control logic circuit 554 and an input buffer 556. The input buffer is preferably organized as a first-in, first-out (Rx FIFO) buffer that sequentially receives and transmits data forwarded to the engine by the BQU 210. The Rx state machine receives the predetermined control signals over path 294 and cooperates with the logic 554 to control the transfer of data from FIFO 556. In addition, the logic circuit 554 controls a multiplexer 560 having inputs coupled to an output of the FIFO and the feedback path 350. The logic 554 enables the multiplexer to select one of its inputs in response to a control signal (feedback_enable) provided by the last PE stages of the pipelines. Furthermore, the logic 554 generates write enable signals (in response to a control signal provided by row synchronization logic 600 and buffer addresses that enable the row I/F logic 520 to transfer the contents of the buffers 510. A programmable pipeline advancement mechanism 700 contains circuitry that is programmable by a device (e.g., the RP) via the RP I/F 320 coupled to the maintenance bus 325.

Figure 6:
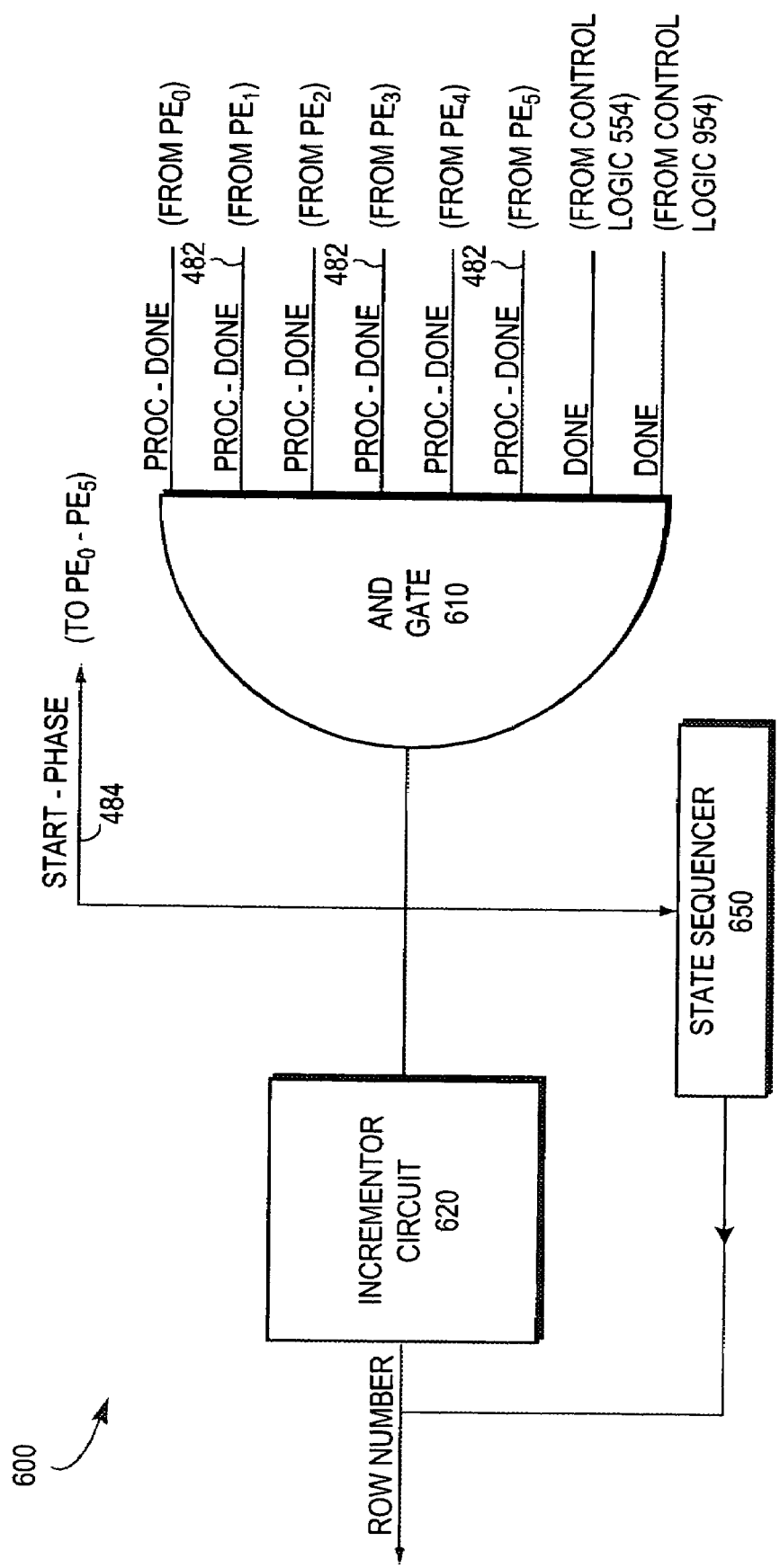
FIG. 6. is a schematic block diagram of a row synchronization logic circuit of the IHB.

FIG. 6 is a schematic block diagram of row synchronization logic (RSL) 600 that controls the pipelines by ensuring that each PE stage completes its processing of current context prior to loading new context at a new phase. To that end, the RSL comprises logic circuitry associated with each pipeline row of the arrayed processing engine. For ease of depiction, circuitry associated with one row will be described, although it will be understood to those skilled in the art that the circuitry associated with the other rows are substantially similar.

The RSL 600 receives processing completion status from each PE stage prior to advancing the pipelines. Specifically as each PE 400 finishes its task, it asserts a global pipeline completion signal (proc_done) over lines 482 that is collected by a logic circuit, schematically shown as an AND gate 610. Other completion signals (done) are provided as inputs to the gate from the control logic 554, 954. In response to assertion of all completion signals, the gate 610 generates a beginning of next phase signal (start_phase) over line 484. The start_phase signal informs each PE stage that there is valid context data in its context memory that its TMC core can begin processing. In addition, start_phase signal is transformed by an incrementor circuit 620 into incremented row number, while being analyzed by a state sequencer circuit 650 prior to being fed to the input control logic 554.

Figure 7:
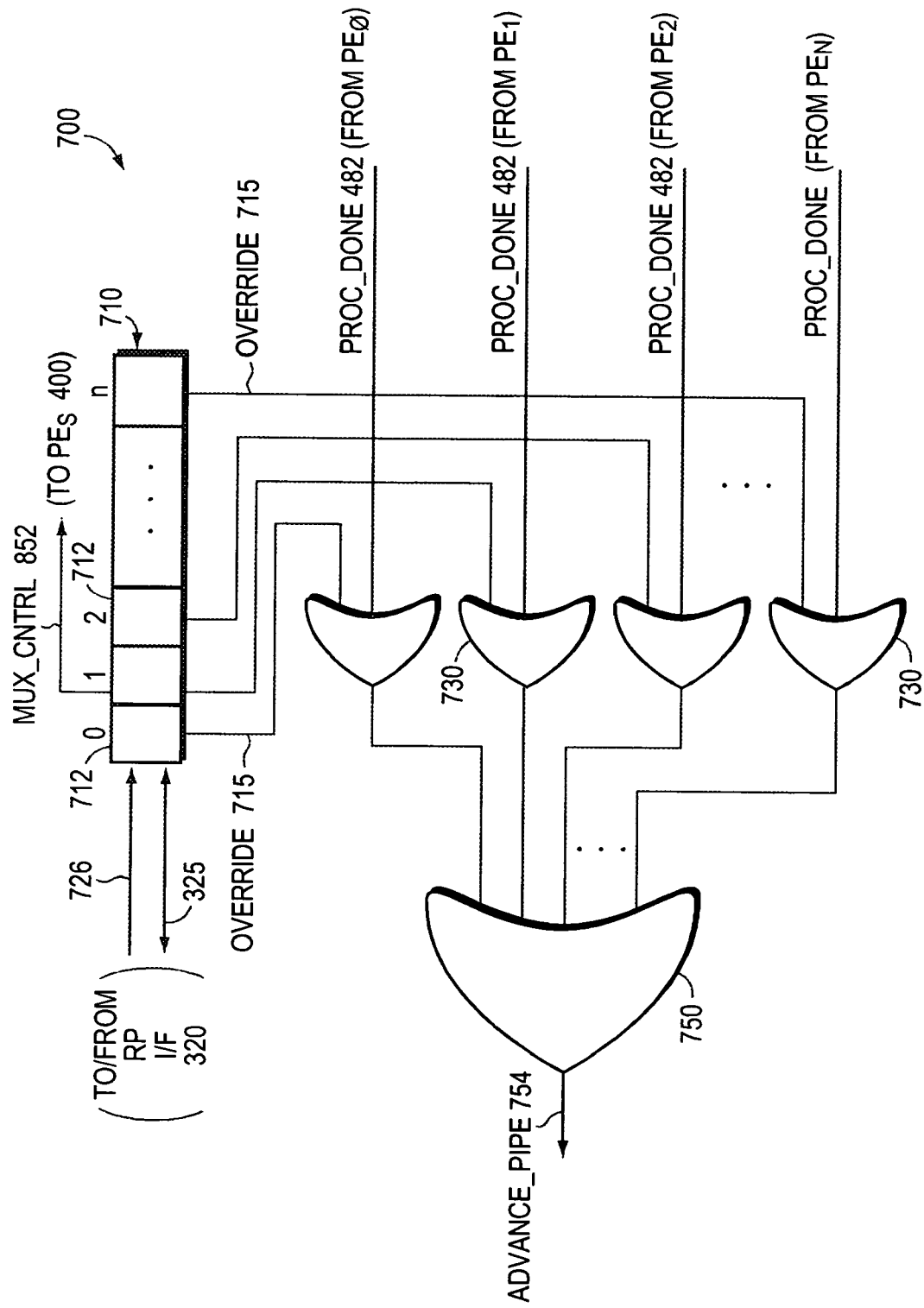
FIG. 7 is a schematic block diagram of a programmable pipeline advancement circuit for implementing a programmable pipeline advancement aspect of the present invention.

FIG. 7 is a schematic block diagram of a multi-level, programmable pipeline advancement (PPA) circuit 700 contained within the IHB 500 for implementing a programmable pipeline advancement aspect of the present invention. A PPA register 710 is provided for each pipelined row of the processing engine; the register includes a bit location 712 for each PE 400 of the pipeline. Each proc_done completion signal 482 returned by a TMC 410 upon completion of its task is collected by a first level logic circuit, schematically shown as an OR gate 730, which also receives a corresponding bit 712 of the register 710. The output of each first level OR gate is then collected by a second level logic circuit, shown as OR gate 750 having an output that advances the pipeline in accordance with an advance_pipe signal 754.

The PPA register 710 is preferably a 32-bit register that is accessible via the maintenance bus 325 coupled to the RP I/F 320. As noted, the maintenance bus 325 is preferably a 32-bit bus having multiplexed address/data lines. That is, the data lines are used to load and retrieve the contents of the register 710 when writing and reading data. The address lines of the bus 325 are used in connection with IHB select signals transported over IHB select lines 726 to enable selection of a PPA register for a particular row.

In order to bypass (ignore) a particular PE 400, an asserted bit (e.g., "1") may be loaded into a respective bit location 712 of the register via a respective data line of the maintenance bus 325. The state of the respective bit location 712 is transformed into an asserted override signal 715 that effectively overrides the proc_done signal 482 typically returned by that particular PE. This technique allows programming of the register (by the RP) to ignore a particular PE for as many phases as required; that is, the contents of the register do not have to be re-written after every phase of execution in the pipeline.

Another aspect of the present invention is directed to a mechanism for programming a code entry point for each TMC 410. Referring again to FIG. 4, each IRAM 420 of a PE 400 includes a data structure organized as a program counter (PC) table 810 having a plurality of PC entries 812. Each entry 812 preferably contains a PC value that points to (i.e., references) a particular program/routine from which the downstream TMC fetches instructions (from the IRAM 420) for execution. Prior to a context switch, the system forces this PC value into an appropriate register of the downstream TMC of the pipeline to facilitate processing by the downstream TMC in accordance with instructions stored in the IRAM. Instead of providing an actual PC value to a downstream TMC, an upstream TMC core 410 provides a PC index 805 over a PC index bus 802 to the downstream TMC. The PC index 805 is preferably a 3-bit value used to address (select) one of the PC entries, each of which contains an actual PC value, e.g., PC0–7.

Specifically as an upstream TMC completes execution of its program segment/routine, it executes a last instruction requiring it to supply a PC index 805 to the downstream TMC. The PC index selects a particular PC entry containing a program counter value that references an entry point to a routine for execution by the downstream TMC. If the upstream TMC is not functioning (because it has failed or is otherwise "isolated"), it transmits either a default value or no value at all as the PC index 805.

Figure 8:
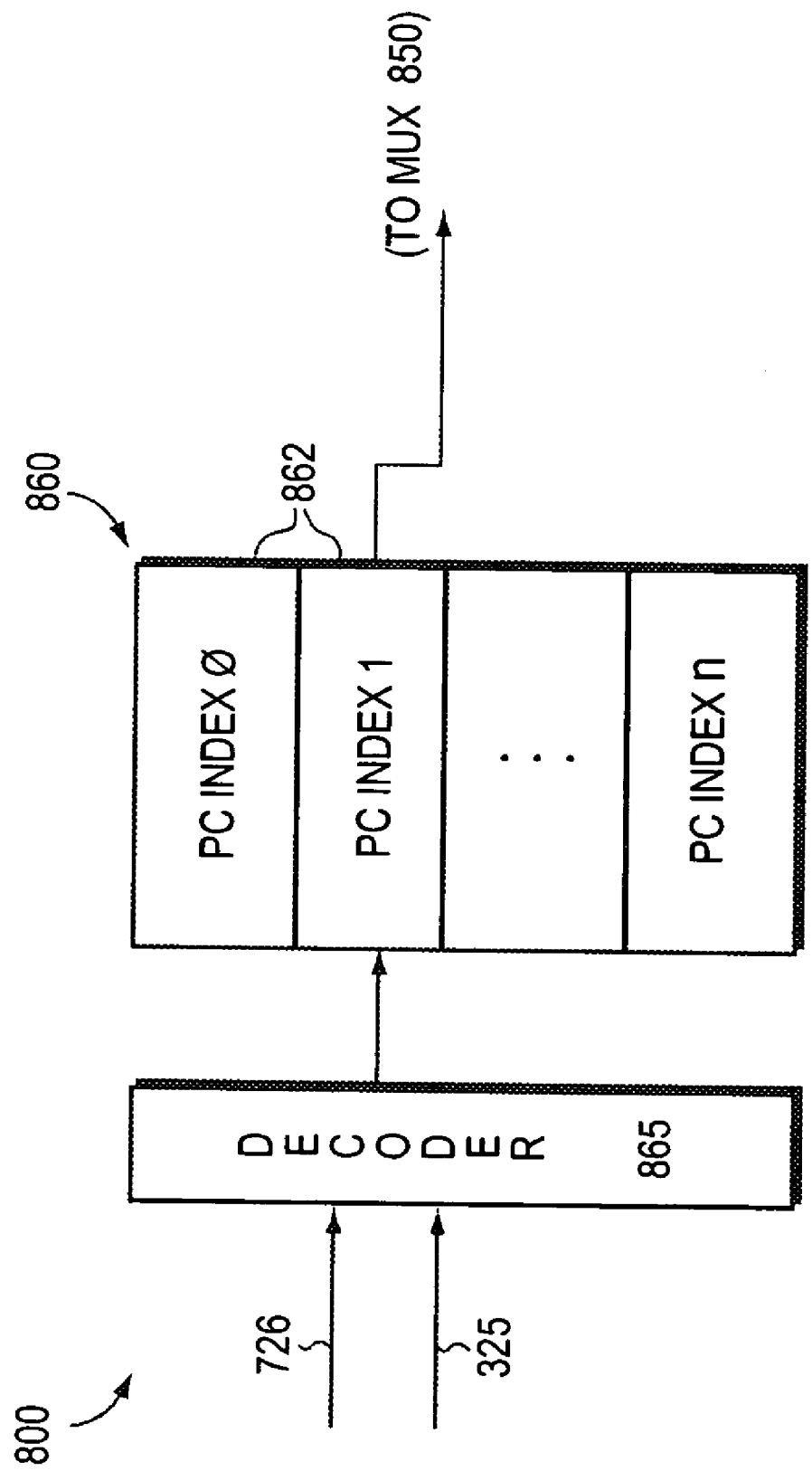
FIG. 8 is a schematic diagram of a portion of programmable entry point circuit for implementing a programmable entry point aspect of the present invention.

In the illustrative embodiment, the programmable entry point (PEP) mechanism comprises a PEP multiplexer 850 coupled to the PC index bus 802 that interconnects adjacent pipelined PEs 410 of the processing engine 300. One input to the multiplexer 850 is coupled to the PC index bus 802 while the other input is coupled to a set of addressable registers 860 in accordance with the invention. FIG. 8 is a schematic diagram of a portion of the PEP circuitry 800 contained within the IHB 500 and accessible over the maintenance bus 325. The set of addressable registers 860 is provided on a per column basis such that each register 862 includes a PC index value similar to that provided by an upstream TMC to a downstream TMC over the PC index bus 802.

For example, assume there are eight (8) entries 862 in the register set 860 and each entry contains an index value ranging from 0 (000) to 7 (111). The content of one of the addressable registers 862 may be substituted for the PC index 805 provided by an upstream TMC as an appropriate value for addressing a PC table entry 812. The state of the respective bit location 712 of the PPA register 710 (i.e., the override signal) is used as a multiplexer (mux) control signal 852 for controlling selection of the inputs to the multiplexer 850. In response to bypassing a particular PE 400, the asserted mux control signal 852 selects the input coupled to the register set 860 to thereby provide a programmed PC index value to the particular PE.

In the illustrative embodiment, each multiplexer 850 is located at an input of each PE 400 to enable branching into any portion of a program/routine regardless of the action/inaction of an upstream processor. An IRAM decoder circuit 880 is coupled to and cooperates with each PC table 810 to transform the states of the PC index bits 805 to an address suitable for accessing an entry 812 in the PC table. In addition, a register set decoder circuit 865 is coupled to and cooperates with the set of registers 860 to transform the states of the (i) address signals on bus 325 and IHB select signals on lines 726 into signals for accessing the registers 862 and (ii) data signals on bus 325 to PC indexes loaded into the registers.

Once a TMC processor 410 has completed execution of its program/routine and it has received an advance_pipe signal 754 from the IHB, the TMC processes a new PC value based on the PC index 805 supplied by the multiplexer 850. This PC value provides an entry point into a next routine for execution by the TMC core 410. Therefore, the circuitry described above for the IHB and processor complex stages enables advancement of the processor pipeline even if a particular processor complex is not operational. The circuitry 800 further enables overriding of a default signal provided by a faulty upstream PE 300 as the PC index 805 for the downstream TMC processor 410 of a pipeline.

As noted, data bypassing capabilities are generally not required for processor stages of a conventional pipeline processor because each processor stage is typically "hardware assisted" in that there are specific circuits associated with the function performed by each stage on data passing through the pipeline. Therefore, a subsequent processor stage generally cannot be programmed to perform the function of a previous stage, completion of which is typically required prior to performance of the subsequent stage function.

In contrast, each PE 400 of the arrayed processor engine 300 is identical and programmable such that the function performed by each processor complex may include the function performed by another processor complex of the pipeline. Thus if a particular PE stage of a pipeline is not functional, a subsequent PE stage can be programmed to perform its function in addition to the function of that particular PE stage. Accordingly, bypassing of stages within a pipeline of the processor engine can be performed and still enable the processor engine 300 to function properly, as opposed to prior systems.

In accordance with the illustrative embodiment of the present invention, a data bypass technique involves use of the data mover 440 and the context memories 435 within each PE 400 of the processing engine 300. Since the manufacturing defects are mostly associated with the IRAM 420 and TMC processor core 410 of each PE, the context memories 435 are not as susceptible to defects and may in fact be operational even if the other elements of the PE are defective. Moreover, the data mover 440 is an independent entity (i.e., independent of the TMC core 410) that may be placed in a copy mode to essentially copy the data from one context memory (e.g, CMA) to another (e.g, CMB) as previously described.

Figure 9:
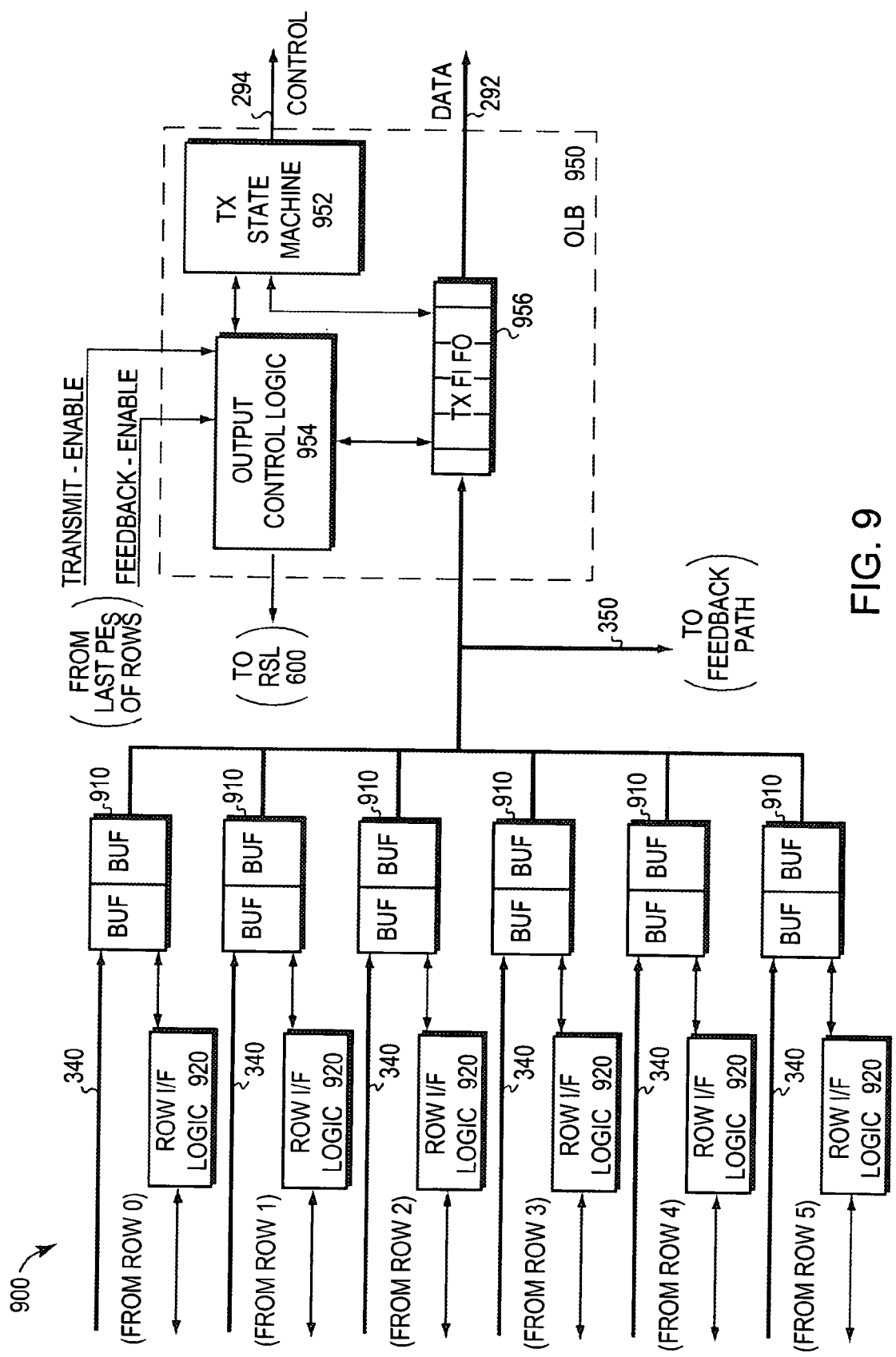
FIG. 9 is a schematic block diagram of an output header buffer of the programmable arrayed processing engine.

FIG. 9 is a schematic block diagram of the OHB 900 whose internals are substantially similar as those of the IHB 500. That is, the OHB comprises a plurality of buffer pairs (BUF 910), each of which is associated with a pipeline row for receiving data processed by the row. Row I/F logic 920 provides write enable, data and address signals to and from the buffers and context memories of the PEs. In addition, the OHB includes an output logic block (OLB 950) comprising a transmit (Tx) state machine 952 coupled to an output control logic circuit 954 and an output buffer organized as a Tx FIFO 956 that sequentially transfers data from the engine to the BQU 210.

An advantage provided by the novel isolation technique described herein is the ability to debug, in an easy and fast manner, complex multiprocessor linked code. In addition, the inventive debug capability allows use of a highly integrated circuit having a plurality of processor pipelines despite the presence of certain defects within stages of the pipeline, such as non-functioning IRAMs and TMCs. The enhanced debug mechanisms further enable isolation of a single processor complex, a column of the processor complexes or a row of processor complexes in the arrayed processor engine.

While there has been shown and described an illustrative embodiment for enhancing debug capability in a highly-integrated multiprocessor circuit containing a programmable arrayed processing engine, it is to be understood that various other adaptations and modifications may be made within the spirit and scope of the invention. For example, the data bypassing aspect of the present invention may include a bypass data multiplexer located at the input of each processor complex. As with the previous circuitry described above, the mux_cntrol signal 852 from the IHB 500 can be used to control the bypass data multiplexer. A drawback to this particular approach is the overhead associated with all of the data lines coupled to the inputs (e.g., two inputs) of each bypass multiplexer. That is, the 64-bit data path 340 must be provided to both inputs of the multiplexer, thereby substantially increasing the circuitry and wires associated with each subsequent stage of the pipeline.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for enhancing debug capability in a multi-processor circuit, comprising:
    a plurality of processors arranged so that data advances from processor to processor during normal operation, each processor being a part of a processor complex that includes a first context memory for data to be processed, and a second context memory for data that has been processed;
    an advancement circuit, the advancement circuit configured to advance data among the processors in the event of failure of a processor; and
    a data bypass circuit configured to pass the data through the processor complex with the failed one of the processors, by moving the data from the first context memory to the second context memory of that processor complex absent processing.

2. The apparatus as in claim 1, wherein said data bypass circuit further comprises:
    a bypass register.

3. The apparatus as in claim 1, further comprising:
    said plurality of processors arranged to process data as a pipeline.

4. The apparatus as in claim 1, further comprising:
    said plurality of processors arranged to process data as a pipeline; and
    a bypass register, said bypass register having a bit location for each processor of the pipeline, each bit location capable of storing an override signal.

5. The apparatus as in claim 1, further comprising:
    a memory, said memory storing computer code, said computer code having a code entry point selected by said data bypass circuit to enable a downstream processor to do the work of the failed processor.

6. A method for enhancing debug capability in a multi-processor circuit, comprising:
    advancing data among a plurality of processors during normal operation in response to completion signals from each of the processors;
    advancing data among the processors in the event of failure of a processor in response to an override signal; and
    passing the data through a processor complex including the failed one of the processors by moving data from a first context memory to a second context memory of the processor complex absent processing.

7. The method apparatus as in claim 6, further comprising:
    indicating that a processor is to be bypassed by a bypass register.

8. The method as in claim 6, further comprising:
    arranging said plurality of processors to process data as a pipeline.

9. The method as in claim 6, further comprising:
    arranging said plurality of processors to process data as a pipeline; and
    storing the override signal in a bit location of a bypass register.

10. The method as in claim 6, further comprising:
    storing computer code in a memory, said computer code having a code entry point selected by said data bypass circuit to enable a downstream processor to do the work of the failed processor.

11. Apparatus for enhancing debug capability in a multi-processor circuit, comprising:
    means for advancing data among a plurality of processors, during normal operation in response to completion signals from each of the processors;
    means for advancing data among the processors in the event of failure of a processor in response to an override signal; and
    means for passing the data through a processor complex including the failed one of the processors by moving data from a first context memory to a second context memory of the processor complex absent processing.

12. The apparatus as in claim 11, further comprising:
    means for indicating that a processor is to be bypassed.

13. The apparatus as in claim 11, further comprising:
    means for arranging said plurality of processors to process data as a pipeline.

14. The apparatus as in claim 11, further comprising:
    means for arranging said plurality of processors to process data as a pipeline; and
    means for storing an override signal in a bit location of a bypass register.

15. The apparatus as in claim 11, further comprising:
    means for storing computer code, said computer code having a code entry point selected to enable a downstream processor to do the work of a failed processor.

16. Logic encoded on one or more tangible computer readable media for execution, and when executed, operable to:
    advance data among a plurality of processors during normal operation in response to completion signals from each of the processors;
    advance data among the processors in the event of failure of a processor in response to an override signal; and
    pass data through a processor complex including the failed one of the processors by moving data from a first context memory to a second context memory of the processor complex absent processing.

* * * * *